United States Patent
Oh et al.

(10) Patent No.: US 9,197,896 B2
(45) Date of Patent: Nov. 24, 2015

(54) IMAGE ENCODING APPARATUS

(71) Applicant: M & K HOLDINGS INC., Seoul (KR)

(72) Inventors: Soo Mi Oh, Gyeonggi-Do (KR); Moonock Yang, Singapore (SG)

(73) Assignee: M & K HOLDINGS INC., Seoul (KR)

( * ) Notice: Subject to any disclaimer, the term of this patent is extended or adjusted under 35 U.S.C. 154(b) by 0 days.

(21) Appl. No.: 14/687,424

(22) Filed: Apr. 15, 2015

(65) Prior Publication Data

US 2015/0222894 A1 Aug. 6, 2015

Related U.S. Application Data

(63) Continuation of application No. 13/624,753, filed on Sep. 21, 2012, now Pat. No. 9,100,651, which is a continuation of application No. PCT/KR2011/002972, filed on Apr. 22, 2011.

(30) Foreign Application Priority Data

Apr. 23, 2010 (KR) ......................... 10-2010-0038158

(51) Int. Cl.
*H04N 19/109* (2014.01)
*H04N 19/129* (2014.01)
*H04N 19/61* (2014.01)
*H04N 19/96* (2014.01)
*H04N 19/11* (2014.01)
*H04N 19/136* (2014.01)
*H04N 19/18* (2014.01)
*H04N 19/122* (2014.01)
*H04N 19/159* (2014.01)
*H04N 19/176* (2014.01)
*H04N 19/91* (2014.01)
*H04N 19/13* (2014.01)

(52) U.S. Cl.
CPC ............ *H04N 19/109* (2014.11); *H04N 19/11* (2014.11); *H04N 19/122* (2014.11); *H04N 19/129* (2014.11); *H04N 19/13* (2014.11); *H04N 19/136* (2014.11); *H04N 19/159* (2014.11); *H04N 19/176* (2014.11); *H04N 19/18* (2014.11); *H04N 19/61* (2014.11); *H04N 19/91* (2014.11); *H04N 19/96* (2014.11)

(58) Field of Classification Search
CPC ........................... H04N 19/18; H04N 19/109
See application file for complete search history.

(56) References Cited

U.S. PATENT DOCUMENTS

| 8,976,861 | B2 * | 3/2015 | Rojals et al. | ............. 375/240.02 |
| 2010/0118971 | A1 * | 5/2010 | Tanida et al. | ............. 375/240.23 |
| 2012/0008683 | A1 * | 1/2012 | Karczewicz et al. | ..... 375/240.12 |
| 2012/0170649 | A1 * | 7/2012 | Chen et al. | ............... 375/240.12 |

(Continued)

*Primary Examiner* — Sath V Perungavoor
*Assistant Examiner* — James Pontius
(74) *Attorney, Agent, or Firm* — Mintz Levin Cohn Ferris Glovsky and Popeo, P.C.; Kongsik Kim; Jonathon Western

(57) ABSTRACT

Provided is a moving picture coding apparatus for increasing a compression ratio of a moving picture signal while maintaining high image quality. To minimize the number of bits required for a residual block, quantized transform coefficients are adaptively divided into a plurality of subsets according to a size of a transform block, and non-zero quantized transform coefficients of each subset are scanned and encoded. Also, an intra prediction mode of the current block is determined using reference pixels obtained by filtering reference pixels of the current block. Accordingly, it is possible to minimize the amount of data required for the residual block of the current block.

5 Claims, 5 Drawing Sheets

(56) References Cited

U.S. PATENT DOCUMENTS

2013/0058407 A1* 3/2013 Sole Rojals et al. ..... 375/240.12
2013/0188724 A1* 7/2013 Nguyen et al. ........... 375/240.18
2013/0343454 A1* 12/2013 Yeo et al. ................. 375/240.03
2014/0321529 A1* 10/2014 Jung et al. ................ 375/240.02
2015/0078432 A1* 3/2015 Wang et al. .............. 375/240.02
2015/0078447 A1* 3/2015 Gamei et al. ............. 375/240.12

* cited by examiner

IMAGE ENCODING APPARATUS

CROSS-REFERENCE TO RELATED APPLICATIONS

This application is a continuation application of application Ser. No. 13/624,753 filed on Sep. 21, 2012, which is a continuation of International Application No. PCT/KR2011/002972 filed on Apr. 22, 2011, which claims priority to Korean Application No. 10-2010-0038158 filed on Apr. 23, 2010. The applications are incorporated herein by reference.

TECHNICAL FIELD

The present invention relates to an image processing apparatus and method, and more particularly, to an apparatus for reducing the amount of residual signals of an image and entropy-coding the residual signals.

BACKGROUND ART

To efficiently transmit a moving picture signal at a low data rate while maintaining high image quality, various digital moving picture compression technologies have been proposed. These moving picture compression technologies include H.261, Motion Picture Experts Group (MPEG)-2/H.262, H.263, MPEG-4, Advanced Video Coding (AVC)/H.264, and so on. The compression technologies include a discrete cosine transform (DCT) scheme, a motion compensation (MC) scheme, a quantization scheme, an entropy coding scheme, and so on.

For image coding, each picture is divided into a plurality of slices, and each slice is divided into a plurality of coding blocks of a predetermined size. Since an image of a high-definition (HD) grade or above has many flat areas, an image compression can be improved by encoding the image with coding blocks that are larger than a macroblock (MB).

Therefore, new prediction technique is required and changes in transform coding, entropy coding, intra prediction and inter prediction is required as the size of the coding unit increases to increase image compression ratio without increase of the complexity of image compression.

SUMMARY OF THE DISCLOSURE

The present invention is directed to an apparatus for encoding a moving picture, and more particularly, to an apparatus for effectively encoding transformed residual signals of a moving picture having a predetermined size or more.

One aspect of the present invention provides an apparatus for encoding a moving picture, including: a coding mode determiner configured to divide an input image into coding units and determine a prediction mode of the coding unit and a size of a predictive coding block of the coding unit; a transform/quantization unit configured to transform and quantize a residual block between the predictive coding block and a prediction block generated through intra prediction or inter prediction; an inverse quantization/transform unit configured to inversely quantize and inversely transform the quantized transform block into a frequency domain; a deblocking filter configured to apply a deblocking filtering process to image data received from the inverse quantization/transform decoding unit; a prediction block generator configured to generate the predictive coding block; and an entropy coder configured to encode the quantized transform coefficients from the transform coding/quantization unit, wherein, when a size of a transform block is equal to or larger than a predetermined size, the entropy coder divides the quantized transform coefficients into a plurality of subsets, and scans and entropy-codes non-zero quantized transform coefficients of the each subset.

The present invention enables coding efficiency to be enhanced by reducing the amount of residual signals of a block to be encoded. Also, by effectively scanning a quantized transform coefficient other than 0 during entropy coding, the number of bits required for the entropy coding is minimized, such that the coding efficiency can be improved.

DETAILED DESCRIPTION OF THE DISCLOSURE

Figure 1:
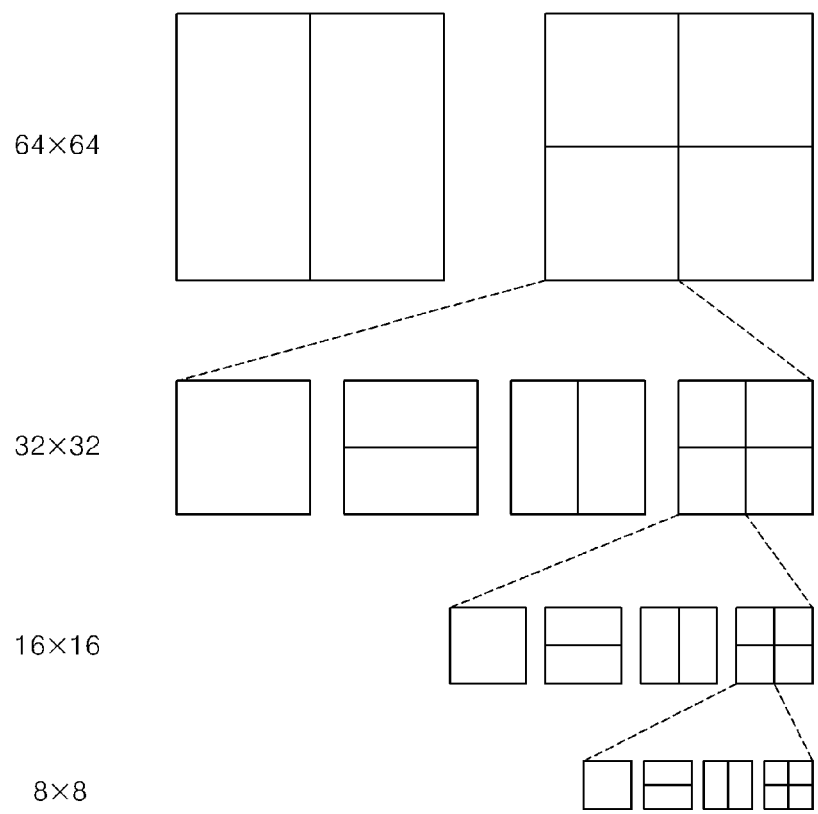
FIG. 1 shows a block division structure according to an exemplary embodiment of the present invention.

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible and it is to be understood that within the scope of the disclosed concept, the present invention may be practiced otherwise than as has been specifically described.

For image coding, each picture is divided into a plurality of slices, and each slice is divided into a plurality of coding units of a predetermined size. Since an image of a high-definition (HD) grade or above has many flat areas, an image compression ratio can be improved by encoding the image with coding units that are greater than a macroblock (MB) having a size of 16×16.

Coding unit according to the present invention may be a block having a size of 32×32 or block having a size of 64×64 as well as MBs having the size of 16×16. Also, a block having a size of 8×8 or less may be the coding unit. For convenience, the largest coding unit is referred to as a super macroblock (SMB). A size of the SMB may be determined according to information indicating a size of the smallest coding unit and depth information. The depth information indicates a difference between a size of the SMB and a size of the smallest coding unit.

Thus, coding unit that will be used for encoding all pictures of an image sequence may be SMB or sub-block of the SMB. The allowable sizes of the coding units may be designated by default or in a sequence header. When the allowable sizes of coding units are designated in the sequence header, the allowable sizes of the coding units are designated according to the size of the smallest coding unit and the depth information.

Each picture or slice is divided into a plurality of SMB units. Each SMB or sub-block of the SMB may is intra-coded or inter-coded and decoded.

To enable the coding unit (i.e., an SMB or a sub-block of the SMB) to be accurately decoded, an encoder should add size information on a predictive coding block of the coding unit and prediction mode information indicating that the coding unit has been coded in intra prediction mode or in inter prediction mode to a bit stream. To this end, the prediction mode information and the information indicating the size of the predictive coding block should be included in the bit stream of coding unit. The prediction mode varies according to a type of the slice.

When the type of the slice is intra (I), all predictive coding blocks in the slice are intra predicted, and a prediction type of a predictive coding block can be determined according to a size of the predictive coding block. However, when the slice type is unidirectional prediction (P) or bidirectional prediction (B), a prediction type of a predictive coding block may be determined according to prediction mode information and a size of the predictive coding block. Thus, it is preferable to generate the prediction type of the predictive coding block on the basis of the slice type, the prediction mode information and the information indicating the size of the predictive coding block, and insert the generated prediction type in a header of the coding unit.

When the predictive coding block is intra-coded, intra prediction mode information used for intra prediction as well as the prediction type needs to be transmitted to a decoder.

When the predictive coding block is inter-coded, the predictive coding block is encoded by any one of unidirectional prediction and bidirectional prediction. In the case of unidirectional prediction, a bit stream should include information on a reference picture and motion vector information used for prediction as well as a prediction type of the predictive coding block for unidirectional prediction. In the case of bidirectional prediction, a header of the predictive coding block should include information on two reference pictures and motion vector information used for bidirectional prediction as well as a prediction type of the block for bidirectional prediction. The motion vector information may include information indicating a residual motion vector and a motion vector predictor.

FIG. 1 shows a hierarchical division structure illustrating allowable predictive coding blocks for a SMB having a size of 64×64 according to an exemplary embodiment of the present invention.

When an SMB is used as a coding unit, it is preferable to have four sub-block division steps as shown in FIG. 1, but block division is not limited to the four sub-block division steps. When there are four sub-block division steps, a total of 13 predictive block types (64×64, 64×32, 32×64, 32×32, 32×16, 16×32, 16×16, 16×8, 8×16, 8×8, 8×4, 4×8 and 4×4) can be defined.

Here, there may be no data to be transmitted for inter predictive coding blocks having a greater size than an MB. Thus, it is preferable to newly add an MB64_SKIP mode when a size of a predictive coding block is 64×64, and an MB32_SKIP mode when the size of the predictive coding block is 32×32. To transmit the mode information to the decoder, an MB64_SKIP_flag or an MB32_SKIP_flag may be used. When values of these flags are 1, there is no transmission data of the corresponding predictive coding block.

Meanwhile, when plural successive SMBs are not encoded, an MB64_SKIP_flag may be inserted in a first SMB only, and may be omitted in the following SMBs. In this case, the number of SMBs that are successively skipped may be added to the slice or the first SMB. Specifically, when the plural of successive SMBs are not encoded, a SMB_SKIP_flag of the first SMB is set to 1, and may also be applied to several successive SMBs in common. In this case, information corresponding to the number of SMBs that are not successively encoded (e.g., an SMB_SKIP_number) may be added to the slice.

When a coding unit has a size of 32×32, block having a size of 32×32, 32×16 or 16×32 in addition to existing block having a size of 16×16, 16×8, 8×16, 8×8, 8×4, 4×8 or 4×4 can be used as a predictive coding block.

In an inter-prediction mode, a prediction type (Mb32_type) of a coding unit may indicate a 32×32 partition when the prediction type is 0, a 32×16 partition when the prediction type is 1, a 16×32 partition when the prediction type is 2, and a 16×16 partition when the prediction type is 3.

When a coding unit is divided into four sub-coding units, the four sub-coding units are encoded and transmitted in a raster scan order. In this case, a quantization parameter may be transmitted for each coding unit, and may be transmitted only once in a header of a super-coding unit when the same quantization parameter is applied to all the sub-coding units. However, when a quantization parameter needs to be changed in a sub-coding unit, only a difference value with respect to a quantization parameter of the upper layer coding unit or the preceding coding unit of the same level may be transmitted.

Each sub-coding unit may be divided using a quadtree method, and a coded block pattern (cbp) and a residual coefficient may also be transmitted using the quadtree method. When a 1-bit cbp is used, a cbp value of 1 may indicate that the coding unit has at least one coefficient other than 0, and a cbp value of 0 may indicate that all coefficients are 0.

Figure 2:
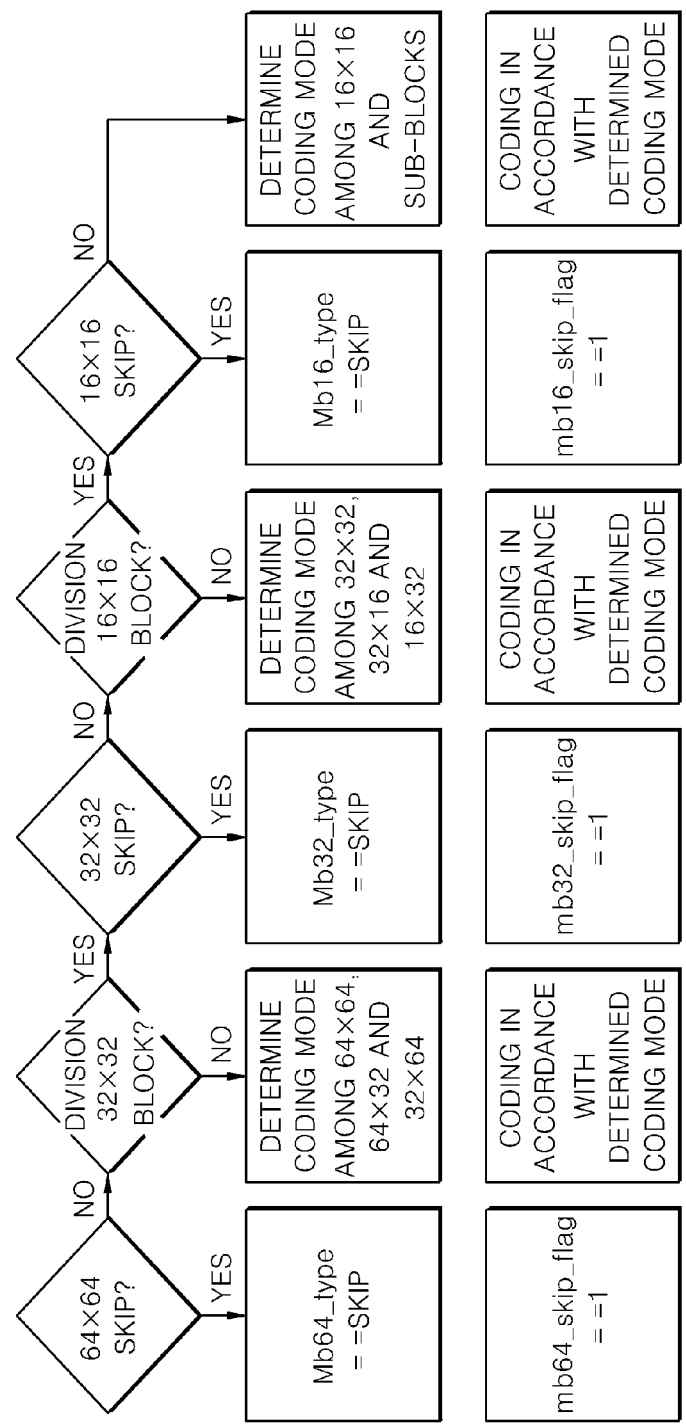
FIG. 2 illustrates a method of determining a coding mode according to the present invention.

FIG. 2 illustrates a method of determining a coding mode when a size of an SMB is 64×64 according to the present invention.

As illustrated in FIG. 2, when an SMB is a 64×64 block, an encoder determines whether or not it is possible to skip the 64×64 block, and determines a SKIP mode as a coding mode when it is possible to skip the 64×64 block. At this time, an mb64_skip_flag should be transmitted to the decoder. When the 64×64 block has data to be encoded but is not divided into 32×32 blocks, coding size of the SMB which is one of 64×64, 64×32 and 32×64 and information about whether the SMB is intra-coded or inter-coded is inserted in an SMB header, and an SMB data block is generated using encoded data.

When the 64×64 block has data to be encoded and is divided into 32×32 blocks, it is likewise determined whether there is data to be encoded in the corresponding 32×32 blocks. When there is no data to be encoded in the corresponding 32×32 blocks, the SKIP mode is determined as the 32×32 block mode, and an mb32_skip_flag is transmitted to the decoder. However, when the 32×32 block has data to be encoded but is not divided into 16×16 blocks, coding size of the 32×32 block which is one of 32×32, 32×16 and 16×32 and information about whether the 32×32 blocks are intra-coded or inter-coded is inserted in headers of the 32×32 blocks, and a data block is generated using encoded data.

When the 32×32 block has data to be encoded and is divided into 16×16 blocks, it is determined whether there is data to be encoded in the corresponding 16×16 blocks. When there is no data to be encoded in the corresponding 16×16 blocks, the SKIP mode is determined as the 16×16 block mode, and an mb16_skip_flag is transmitted to the decoder. On the other hand, when there is data to be encoded in the corresponding 16×16 blocks, coding size of the 16×16 block which is one of 16×16, 16×8 and 8×16 and information about whether the 16×16 block is intra-coded or inter-coded is inserted in a header of the 16×16 block, and a data block is generated using encoded data.

When blocks having such a variety of sizes are used, block size information may vary according to each sequence level, picture level, slice level, SMB or sub-coding unit of the SMB.

Figure 3:
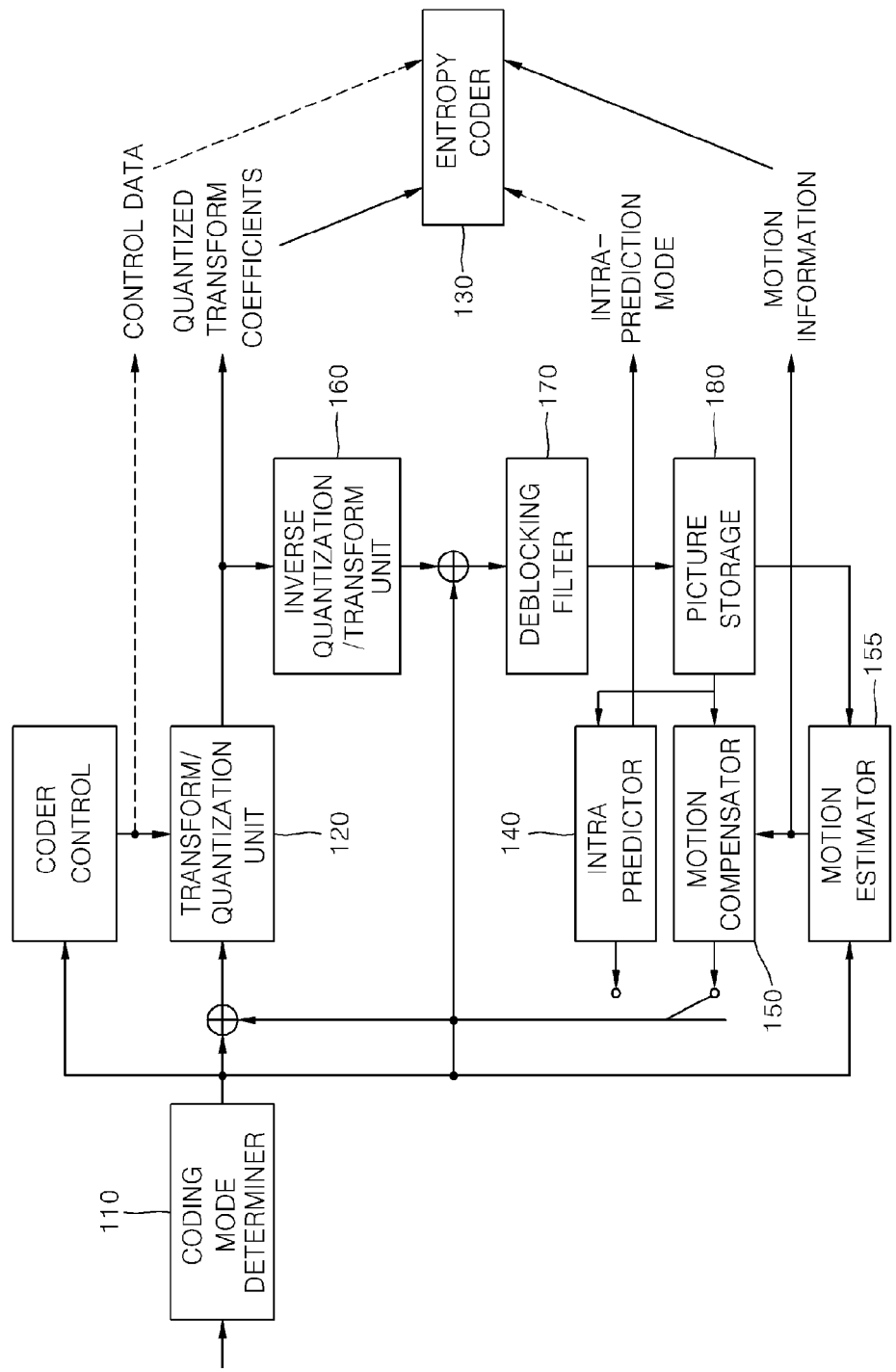
FIG. 3 illustrates an apparatus for encoding a moving picture according to the present invention.

FIG. 3 illustrates an apparatus for encoding a moving picture according to the present invention.

Referring to FIG. 3, an apparatus for encoding a moving picture according to the present invention includes a coding mode determiner 110, a transform/quantization unit 120, an entropy coder 130, an intra predictor 140, a motion compensator 150, a motion estimator 155, an inverse quantization/transform unit 160, a deblocking filter 170, a picture storage 180, an adder and a subtracter.

The coding mode determiner 110 analyzes an input video signal to divide a picture into coding units, and determines a size of a predictive coding block and a prediction mode for each coding unit. Also, the coding mode determiner 110 sends the predictive coding block corresponding to the determined size to the subtracter.

The transform/quantization unit 120 determines a size of a transform block to transform residual signal received from the subtracter. The size of a transform block may be equal to or less than that of the predictive coding block, but may be set differently in an inter mode. In other words, the size of the transform block may be greater than that of the predictive coding block in the inter mode. In this case, the transform/quantization unit 120 receives multiple residual blocks from the subtracter and generates one transform block consisting of the multiple residual blocks. A size of the transform block is equal to or less than that of the coding unit. The transform/quantization unit 120 performs a two-dimensional (2D) discrete cosine transform (DCT) on the transform block to generate transform coefficients. The DCT may be an integer DCT.

Also, the transform/quantization unit 120 determines a quantization step size used for quantizing the transform coefficients, and quantizes the transform coefficients using a quantization matrix determined according to the determined quantization step size and a coding mode.

The inverse quantization/transform unit 160 inversely quantizes and inversely transforms the quantization coefficients quantized by the transform coding/quantization unit 120, thereby restoring a residual block in the spatial domain from a residual block transformed into the frequency domain.

The deblocking filter 170 receives image data that is inversely quantized and inversely transformed from the inverse quantization/transform unit 160 and performs a filtering process for removing a blocking effect. The deblocking filtering process may be applied to a boundary between predictive coding blocks and between transform blocks. The boundary is an edge of a grid having a predetermined size or more and the predetermined size may be 8×8. The deblocking filtering process includes a step of determining a boundary to be filtered, a step of determining a boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is less than a first reference value determined according to a quantization parameter.

Two or more filters may exist. When an absolute value of a difference between two pixels adjacent to the block boundary is equal to or greater than a second reference value, a weak filter is selected. The second reference value is determined by the quantization parameter and the boundary filtering strength The picture storage 180 receives filtered image from the deblocking filter 170, stores the image in picture units. The picture may be an image of a frame or an image of a field. The picture storage 180 has a buffer (not shown) capable of storing a plurality of pictures.

The motion estimator 155 performs motion estimation using at least one reference picture stored in the picture storage 180, and outputs a reference picture index representing the reference picture and a motion vector.

The motion compensator 150 extracts a prediction block corresponding to a block to be encoded from the reference picture used for motion estimation among a plurality of reference pictures stored in the picture storage 180 according to the reference picture index and the motion vector input from the motion estimator 155, and outputs the extracted prediction block.

The intra predictor 140 performs intra-prediction using reconstructed pixel values in the same picture. The intra predictor 140 receives a current block to be predictively encoded, selects one of a predetermined number of intra prediction modes according to a size of the current block, and performs intra prediction.

The entropy coder 130 entropy-codes the quantization coefficients quantized by the transform/quantization unit 120, motion information generated by the motion estimator 155, and so on. The quantized transform coefficients are converted into one-dimensional (1D) quantized transform information by a predetermined scanning method and entropy-coded.

An intra prediction process will be described below with reference to FIG. 3.

First, the intra predictor 140 receives position and size information on a coding block to be encoded from the coding mode determiner 110.

Next, the intra predictor 140 receives valid reference pixels for determining an intra prediction mode of the current predictive coding block from the picture storage 180. The reference pixels have already been encoded and restored, and are adjacent to the current predictive coding block (hereafter, referred to as current block). When the current block is positioned at an upper boundary of the current picture, pixels adjacent to the upper side of the current block are not defined. When the current block is positioned at a left boundary of the current picture, pixels adjacent to the left side of the current block are not defined. Also, when the current block is positioned at the upper or left boundary of the slice, pixels adjacent to the upper or left side are not defined.

When there are no pixels adjacent to the left or upper side of the current block or there are no pixels that have been previously encoded and restored as mentioned above, an intra prediction mode of the current block can be determined using only valid pixels.

However, the invalid reference pixels may be generated using pixels adjacent to the current block or available pixel. For example, when pixels of an upper block are not valid, pixels on the upper side may be generated using one or more available reference pixels on the left side.

Meanwhile, even when there are pixels on the upper or left side of the current block, the pixels may be determined as invalid pixels according to a coding mode of a block to which the pixels belongs. For example, when a block to which pixels adjacent to the upper side of the current block belong has been inter-coded and restored, the pixels may be determined as invalid pixels. In this case, reference pixels may be generated using reference pixel of a block having intra mode.

Next, the intra predictor 140 determines the intra prediction mode of the current block using the reference pixels. The number of intra prediction modes depends on a size of the block.

According to the size of the block, 33, 16 or 2 directional modes and at least one non-directional mode are allowed. The non-directional mode may be a direct current (DC) mode or a planar mode.

Different numbers of intra prediction modes can be assigned to blocks having the same size. To indicate that different numbers of intra prediction modes are allowed, information indicating the number of intra prediction modes can be inserted in at least one of a sequence header, picture header, slice header and a coding unit header. It is preferable to insert the information in a sequence header or a picture header.

Next, when the intra prediction mode of the current block is determined, a prediction block of the current block is generated. The prediction block is generated using reference pixels including generated pixel or using a linear combination of the reference pixels on the basis of the intra prediction mode of the current block. For example, in a directional mode of a specific direction, a prediction mode can be generated using reference pixels on the upper side of the current block and those on the left side of the current block.

The valid reference pixels used to generate the prediction block may be filtered reference pixels. A filter to be applied to the valid reference pixels may be plural in number. Also, the plurality of filters may be adaptively applied according to a size of the current block and the intra prediction mode.

Next, a residual block obtained by using the current block and the prediction block generated by the intra predictor 140 are encoded by the transform/quantization unit 120 and the entropy coder 130.

Meanwhile, the intra prediction mode of the current block is separately encoded. The intra prediction mode may be encoded by the intra predictor 140, a separate intra prediction mode coder (not shown) or the entropy coder 130.

The intra prediction mode of the current block is encoded using intra prediction modes of an upper block and a left block of the current block.

First, the intra prediction modes of the left and upper blocks of the current block are derived. When the upper block is plural in number, a leftmost upper block or a block having the minimum mode number is set as an upper block of the current block. Also, when the left block is plural in number, an uppermost left block or a block having the minimum mode number is set as a left block of the current block. When the upper block or the left block is not encoded in intra prediction mode, the DC mode (mode number 2) may be set as an intra prediction mode of the upper block or the left block.

Next, when the intra prediction mode number of the upper or left block is equal to or greater than the number of allowable intra prediction modes of the current block, the intra prediction mode of the upper or left block is converted into one of the intra prediction modes allowed for the current block.

Next, when the intra prediction mode of the current block is equal to one of the intra prediction mode of the left block and the intra prediction mode of the upper block, a flag indicating that the intra prediction mode of the current block is equal to one of the intra prediction mode of the left block and the intra prediction mode of the upper block, and a flag indicating one of the intra prediction modes of the upper and left blocks are transmitted. In this case, when the left and upper blocks of the current block have the same intra prediction mode, only the flag indicating that the intra prediction mode of the current block is equal to one of the intra prediction mode of the left block and the intra prediction mode of the upper block may be transmitted. Likewise, when only one of the intra prediction modes of the upper and left blocks is valid and equal to that of the current block, only the flag indicating the intra prediction mode of the current block is equal to one of the intra prediction mode of the left block and the intra prediction mode of the upper block may be transmitted.

However, when the intra prediction mode of the current block is different from those of the left and upper blocks, it is determined whether or not the intra prediction mode number of the current block is smaller than those of the left and upper blocks.

When it is determined that both of the intra prediction mode numbers of the left and upper blocks of the current block are greater than the intra prediction mode number of the current block, the intra prediction mode of the current block is determined as a final intra prediction mode. However, when only one of the intra prediction mode numbers of the left and upper blocks of the current block is not greater than the intra prediction mode number of the current block, an intra prediction mode having a mode number obtained by subtracting 1 from the intra prediction mode number of the current block is determined as the final intra prediction mode of the current block. Also, when neither of the intra prediction mode numbers of the left and upper blocks of the current block is greater than the intra prediction mode number of the current block, an intra prediction mode having a mode number obtained by subtracting 2 from the intra prediction mode number of the current block is determined as the final intra prediction mode of the current block.

Next, the final intra prediction mode of the current block is encoded. Using different coding tables according to whether or not the upper block of the current block has the same intra prediction mode as the left block of the current block, the final intra prediction mode of the current block is encoded. The intra prediction mode of the upper block or the left block of the current block may be a modified intra prediction mode. In other words, the intra prediction mode of the upper block or the left block of the current block may be an intra prediction mode modified by a table for mapping intra prediction modes allowable for the upper block and the left block to a predetermined number of intra prediction modes. The predetermined number may be 9 or 3.

A quantized transform coefficient coding process of the entropy coder 130 of FIG. 3 will be described below.

The quantized transform coefficients are entropy-coded using context-adaptive variable length coding (CAVLC) or context-adaptive binary arithmetic coding (CABAC). When a size of transform block becomes large, there is a high possibility that a large number of bits will be required to scan and entropy-code coefficients other than 0. Thus, it is preferable to introduce new scan method for reducing the number of bits for a transform block having a size equal to or larger than a predetermined size.

First, it is determined whether or not to divide quantized transform coefficients into a plurality of subsets. It depends on a size of transform block. In other words, when the size of a transform block is equal to or larger than a predetermined size, the quantized transform coefficients are divided into a plurality of subsets. The predetermined size may be 8×8 or 16×16. The plurality of subsets consist of one main subset and one or more residual subsets. The main subset is positioned at an upper left side including a DC coefficient, and the one or more residual subsets cover area other than area that the main subset covers.

Next, when the size of the transform block is equal to or larger than the predetermined size, the quantized transform coefficients are divided into a main subset and one or more residual subsets, and quantized transform coefficients included in each subset are scanned and encoded. The quantized transform coefficients in the subset may be scanned using one of a plurality of scan patterns. A scan pattern in which the number of bits to be encoded becomes the minimum may be selected according to distribution of non-zero pixels of the quantized transform coefficients in the subset. The plurality of scan patterns may include zigzag scan, vertical scan and horizontal scan. Also, vertical scan or horizontal scan of Motion Picture Experts Group (MPEG)-4 may be included. When a scan pattern is transmitted for each subset, a large number of bits are required. Therefore one scan pattern may be applied to a plurality of subsets.

Meanwhile, the scan pattern may be adaptively selected according to the prediction mode and the intra prediction direction. For example, in the inter prediction mode, it is possible to apply only one predetermined scan pattern (e.g., zigzag scan) or one of the plurality of scan patterns. In the former case, scan pattern information does not need to be transmitted to the decoder, but in the latter case, scan pattern information needs to be transmitted to the decoder. In the intra prediction mode, a scan pattern can be selected according to the intra-prediction direction. For example, it is possible to apply horizontal scan in a vertical intra prediction mode, vertical scan in a horizontal intra prediction mode, and zigzag scan in a DC mode.

A scan pattern to be applied to the main subset and the one or more residual subsets may be a predetermined pattern. The predetermined pattern may be zigzag scan. In addition to zigzag scan, horizontal scan or vertical scan may be applied to the subsets. The scan pattern applied to the subsets may also be adaptively determined according to the prediction mode and the intra prediction direction. In other words, in the inter prediction mode, a predetermined scan pattern may be applied to the subsets. In the intra prediction, a scan pattern selected by the intra prediction direction may be applied to the subsets.

It may be effective to scan the quantized transform coefficients in the subset in a reverse direction. In other words, the quantized transform coefficients can be scanned from the last non-zero coefficient of the subset in a reverse direction according to a scan pattern. Likewise, the plurality of subsets are scanned from a subset including the last non-zero coefficient of the transform block to a main subset in a reverse direction Meanwhile, for correct entropy decoding of the decoder, an encoder encodes information capable of indicating a position of the last non-zero coefficient in the transform block and information capable of indicating a position of the last non-zero coefficient in each subset, and transmits the encoded information to the decoder. The information may indicate a position of the last non-zero coefficient in each subset. Also, the information may be map information consisting of flags indicating whether each transform coefficients is 0 or not and flags indicating whether the non-zero coefficient is the last non-zero coefficient or not in the transform block. A scan pattern for generating the map information may be the same as the scan pattern in the subsets.

In another example for scanning quantized transform coefficients of the transform block, the quantized transform coefficients of a transform block may be rearranged using an interleaving method and converted into a plurality of sub-blocks, and each of the sub-blocks may be scanned and encoded.

Meanwhile, when an image has a boundary in a specific direction and an equivalent prediction mode is used, different sub-blocks are used for similar data at a motion boundary portion, and unnecessary overhead may occur. In this case, it may be further effective to divide a coding unit in a specific direction according to a shape of the boundary portion of the image and perform motion estimation on each divided area.

Figure 4:
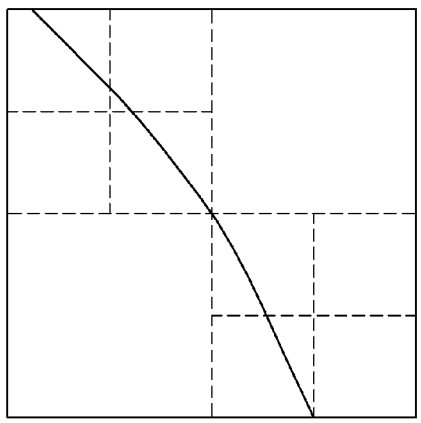
FIGS. 4 to 6 are diagrams illustrating an adaptive block division method according to the present invention.
Figure 5:
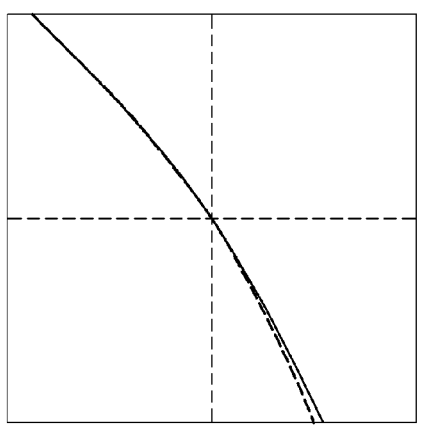
Figure 6:
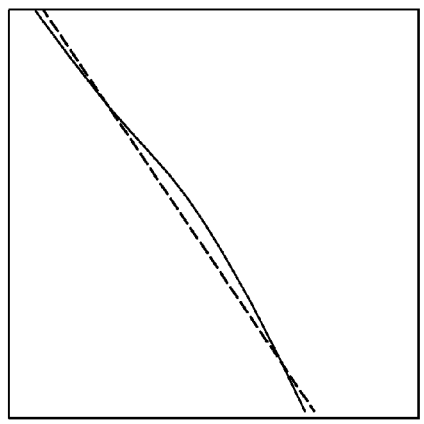

With reference to FIGS. 4 to 6, a method of direction-adaptively dividing a block in consideration of characteristics of an image will be described. In FIGS. 4, 5 and 6, a coding unit of 32×32 will be described as an example. However, the size of a coding unit is not limited to 32×32, and the method can also be applied to a 64×64 block or a 16×16 block.

In one example of the simplest adaptive mode, a coding unit is divided into two blocks by a straight line so as to extract statistical dependency of a prediction area on local topography. In other words, a boundary portion of the image is matched to straight lines and divided.

As shown in the drawings, when there is a boundary that traverses an image of a 32×32 block, a boundary portion traversing the image should be divided into small blocks to efficiently compress the image according to a conventional image division method.

Thus, as shown in FIG. 4, the one 32×32 block should be divided into at least 10 blocks and encoded. Therefore, 10 motion vectors should be transmitted to a decoder together with information for representing image division, and thus much additional information other than image information is required.

Meanwhile, as shown in FIG. 5 or 6, when there is a boundary that traverses the image of the 32×32 block, the number of pieces of additional information to be transmitted to the decoder can be remarkably reduced by matching the image boundary with at least one straight line indicating the image boundary.

For example, when the boundary that traverses the 32×32 block is matched to two straight lines as shown in FIG. 5, the 32×32 block is divided into four 16×16 blocks, and straight lines that match respective first and fourth 16×16 blocks to a block boundary can be obtained. In this case, six division areas are required, and motion vectors to be transmitted to the decoder can be reduced to six.

Likewise, when the boundary that traverses the block is matched to one straight line as shown in FIG. 6, the 32×32 block is divided into two blocks, and only one piece of block mode information and two motion vectors need to be transmitted to the decoder.

Meanwhile, when a block is divided using a straight line, information on the used straight line should be additionally transmitted to the decoder. The straight line information to be transmitted will be described below.

The straight line information to be transmitted can be transmitted using various methods.

A first example is to represent the information on the straight line using a distance and angle with respect to a predetermined position. In this case, the predetermined position may be a pixel at the upper left corner or the center of the block. The distance may be an integer or a quantized value. The angle may be 0 to 180, and may also be a quantized value.

A second example is to transmit position values of both ends of the straight line that traverses the block to the decoder. The position values may be expressed as values indicating how far both of the ends are from the pixel at the upper left corner of the block while going around the boundary of the block clockwise beginning at the upper left corner. In this case, either of the ends may be represented as a position from the pixel while going around the boundary clockwise, and the other may be represented as a position from the pixel while going around the boundary counterclockwise, such that straight line information may be expressed. In this case, information on straight lines close to more various shapes can be expressed using a small number of bits.

When there are neighboring blocks that have been direction-adaptively divided and encoded already, it is effective to transmit differential information between straight line information on the current block and straight line information on one selected from the neighboring blocks. It is more preferable to encode differential information using direction information on blocks divided in the same direction as the current block. The straight line information or differential information on the current block may be expressed as one corresponding index, which may be variable-length coded and transmitted.

Meanwhile, whether or not to apply the direction-adaptive division method may be determined according to a size of a predictive coding block. Since the direction-adaptive division method applied to an excessively small coding block may increase the amount of information and complexity to be transmitted, it is preferable not to apply the method.

Figure 7:
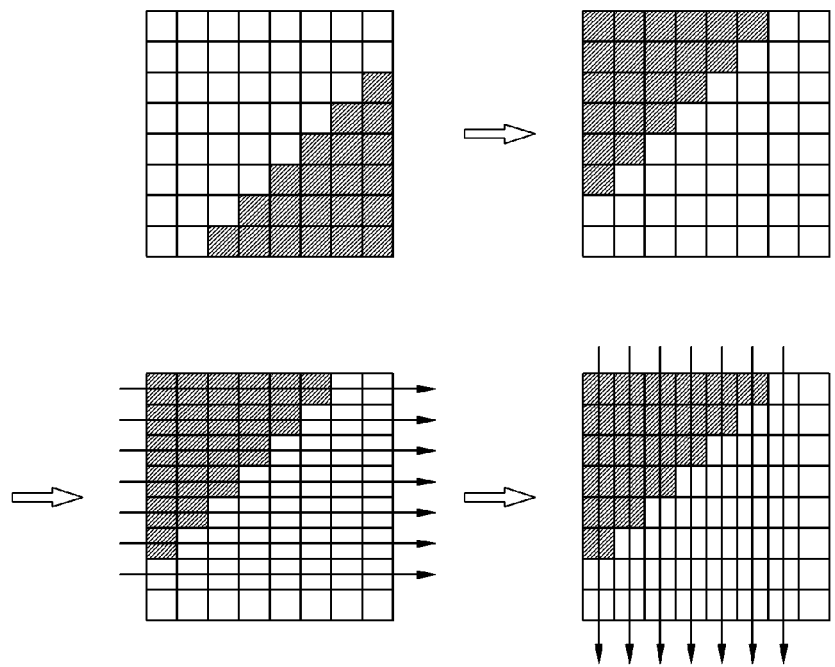
FIG. 7 is a diagram illustrating a method of encoding a residual signal.

As shown in FIG. 7, the method of dividing a predictive coding block according to a shape of a boundary portion of an image may be applied only to specific directions limited to a predetermined number. For example, the method of dividing a block may be limited to four directions of a horizontal direction, a vertical direction, an upward diagonal direction and a downward diagonal direction, or two directions of the horizontal direction and the vertical direction. The number of cases of dividing the block in the specific directions may vary according to a size of the predictive coding block. For example, a predictive coding block having a size of 32×32 may be divided in a specific direction (e.g., the horizontal direction) using seven methods, and a predictive coding block having a size of 16×16 may be divided using three methods. Also, regardless of the size of the predictive coding block, it is possible to divide the predictive coding block using the same number of methods.

According to chroma, the predictive coding block can also be divided into the same partitions, and all the following methods can also be applied to the division. The predictive coding block having respective division areas should include, in a header, a flag indicating presence of a division block, information indicating how the division has been made, and encoded reference picture indices that are referred to according to respective division areas.

When one block is direction-adaptively predicted, motion estimation and motion compensation should be performed on each of two divided areas. Thus, a motion vector should be derived from each of the divided areas, and a residual signal between each of the divided areas and a reference area obtained based on the motion vector should be derived and encoded.

A residual signal can be encoded using any one of the following methods.

First, a residual signal can be derived from each of two areas divided from one predictive coding block, and then the two residual signals can be added to form one block residual signal and transform-coded. In this case, it is quite possible that there will be difference between the overall distribution of residual signals in the respective areas divided along a boundary, and thus it is preferable to apply a filter to the boundary.

In another method, encoding may be performed by applying shape-adaptive transform to each of the divided areas. As shown in FIG. 7, when one block is divided into two areas, an upper left block is subjected to horizontal 1D transform as it is and then vertical 1D transform, and a lower right block is rearranged or rotated by 180 degrees as shown in the drawing and subjected to 1D transform and then vertical 1D transform. In this case, residual coefficients separately encoded according to the respective division areas may be transmitted to the decoder, or may be combined and transmitted.

In still another method, padding may be performed according to the respective divided areas to generate and encode a block. In other words, when a current division area is encoded, the other division area constituting the block is padded with a value of the current division area to constitute the one block and then is subjected to 2D transform coding. Padding may be horizontal padding (horizontally copying an undefined area from a defined area) and vertical padding (vertically copying an undefined area from a defined area). In this case, it is preferable to perform horizontal padding and then vertical padding. Also, an undefined pixel adjacent to one or more defined pixels may be padded through linear combination of the defined pixels. Also, directionality may be given according to a division direction, such that any one of horizontal padding and vertical padding may be performed first.

Next, motion vector estimation will be described.

When one block is divided into two areas using a straight line, a motion vector of each of the divided areas is differentially encoded using an already encoded motion vector.

In a first method, a first area of the divided areas may select one of motion vectors of adjacent blocks as a motion vector predictor, and a second area may select one of motion vectors of adjacent blocks other than the first area as a motion vector predictor.

In a second method, a first area of the divided areas may select one of motion vectors of adjacent blocks as a motion vector predictor, and a second area may select a motion vector of the first area as a motion vector predictor.

In a third method, when there is a direction-adaptively divided block among blocks adjacent to a current block, a motion vector of the direction-adaptively divided block is used as a reference motion vector in consideration of directivity of the divided blocks. Thus, when there are a plurality of direction-adaptively divided blocks, motion vectors in a predetermined sequence or motion vectors of blocks having similar division directions may be used as reference motion vectors.

In a fourth method, a first area of the divided areas may set a motion vector of one of blocks adjacent to the first area as a motion vector predictor of the first area, and a second area may select any one of motion vectors of blocks adjacent to the second area and a motion vector of a block or a division area at the same position in a previous picture as a motion vector predictor and encode a differential motion vector.

Here, one straight line is used for block division. However, it is also possible to divide one block into at least two division areas using information consisting of at least two straight lines, and coding of the divided areas can be performed as described above.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:
1. An image encoding method, comprising:
    determining, by an intra predictor, an intra prediction mode for image or video data;
    generating, by the intra predictor, a prediction block according to the intra prediction mode;

transforming and quantizing, by a transform/quantization unit, a residual block of the prediction block to generate a quantized block; and entropy-coding, by an entropy coder, quantized coefficients of the quantized block, wherein, when a size of the quantized block is equal to 8×8, the quantized coefficients of the quantized block are divided into a plurality of subsets, and the quantized coefficients of each subset and the plurality of subsets are scanned according to a scan pattern determined by the intra prediction mode, and the quantized coefficients of each subset are scanned in a reverse direction from a last non-zero coefficient according to the scan pattern.

2. The method of claim 1, wherein the intra prediction mode is coded using an upper intra prediction mode and a left intra prediction mode, and when the upper intra prediction mode or the left intra prediction mode is unavailable, the upper intra prediction mode or the left intra prediction mode is set to a DC mode.

3. The method of claim 1, wherein when the intra prediction mode is a vertical mode, the scan pattern is a horizontal scan.

4. The method of claim 1, wherein when the intra prediction mode is a horizontal mode, the scan pattern is a vertical scan.

5. The method of claim 1, further comprising generating, by the intra predictor, reference pixels when unavailable reference pixels exist.

* * * * *